(12) United States Patent
Goda et al.

(10) Patent No.: US 6,472,800 B2
(45) Date of Patent: Oct. 29, 2002

(54) FILTER SUBSTRATE AND DISPLAY DEVICE

(75) Inventors: Takuji Goda, Osaka (JP); Katsuya Kamisaku, Osaka (JP); Sadao Kuzuwa, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/098,309

(22) Filed: Mar. 18, 2002

(65) Prior Publication Data

US 2002/0135281 A1 Sep. 26, 2002

Related U.S. Application Data

(63) Continuation of application No. PCT/JP01/04690, filed on Jun. 1, 2001.

(30) Foreign Application Priority Data

Sep. 18, 2000 (JP) ........................................ 2000-282083

(51) Int. Cl.$^7$ .................................................. H01J 5/16
(52) U.S. Cl. ........................................ 313/112; 313/110
(58) Field of Search ................................. 313/110, 112, 313/461, 466, 473

(56) References Cited

U.S. PATENT DOCUMENTS 6,050,870 A     4/2000   Suginoya et al.

FOREIGN PATENT DOCUMENTS

| JP | 8-160405 | 6/1996 |
|----|----------|--------|
| JP | 9-208246 | 8/1997 |
| JP | 11-248922 | 9/1999 |
| JP | 11-292575 | 10/1999 |
| JP | 2000-59082 | 2/2000 |

Primary Examiner—Vip Patel
(74) Attorney, Agent, or Firm—Kanesaka & Takeuchi

(57) ABSTRACT

A glass substrate for a front filter of a display device having considerable strength and excellent display quality, and being lightweight is provided. A display device employing this display filter substrate is provided. The glass substrate has one or more of electromagnetic-wave shielding function, near infrared ray blocking function, and anti-reflection function. The glass substrate has a thickness of 1.8–3.2 mm, an average surface compressive stress of 20–70 MPa, and a warp ratio of the glass substrate of 1.0% or less. The surface compressive stress is applied by an air blast cooling process or a chemical reinforcing process. The filter substrate is disposed over a front surface of the display device.

11 Claims, 1 Drawing Sheet

FILTER SUBSTRATE AND DISPLAY DEVICE

CROSS REFERENCE TO RELATED APPLICATION

This is a continuation application of PCT/JP01/04690 filed on Jun. 1, 2001.

FIELD OF THE INVENTION

The present invention relates to a glass substrate for a filter disposed on a front surface of a display panel and, more particularly to a glass substrate suitable for a front filter of a plasma display panel (PDP). The present invention further relates to a display device provided with the substrate. It should be noted that the present invention may be applied to a field emission display (FED), a cathode ray tube (CRT) or any other display device than the PDP.

RELATED BACKGROUND ART

A plasma display device is provided with a front filter having one or more function of electromagnetic-wave shielding function, near infrared ray blocking function, and anti-reflection function (high transmittance). For improving these functions, JP H11-307987A discloses a front filter substrate which has the surface resistance of 3Ω or less for the electromagnetic-wave shielding function, the transmittance of 20% or less at 850 nm wave length for the near infrared ray blocking function, and the transmittance of 60% or more in a visible wavelength range for the anti-reflection function.

Since a front filter substrate is disposed on a front surface of a display panel, the substrate should have considerable strength and light weight. The strength is fracture strength against external forces. The filer substrate requires sufficient strength for protecting the panel against eternal forces and securing a human body as it comes into contact therewith. Improving strength of the substrate generally conflicts with reducing weight thereof, and it has been difficult to satisfy both these characteristics in a front filter substrate for a display.

Since information and an image displayed on a display device are seen through a filter, deformation such as a warp and waviness which may lead to optical distortion of the filter should be prevented for improving display quality which is the primary function of a display device. Preventing deformation such as a warp conflicts with improving strength and reducing weight. That, is, when the thickness of the substrate is reduced to lower weight thereof, the rigidity of the substrate is also reduced so that the substrate is easily deformed. When the substrate is reinforced to improve its strength, particularly by a reinforcing process having a step of heating and subsequently cooling thereof, the substrate often suffers thermal deformation including a warp, whereby the display device deteriorates in its quality of display.

SUMMARY OF THE INVENTION

It is an object of the present invention to provide a filter substrate which has considerable strength, excellent display quality (due to a little warp and distortion), and reduced weight. The present invention also aims to provide a display device having the substrate.

A filter substrate for a display device of the present invention has a glass substrate and has at least one function of electromagnetic-wave shielding function, near infrared ray blocking function, and anti-reflection function. The glass substrate has a thickness between 1.8 mm and 3.2 mm, an average surface compressive stress between 20 MPa and 70 MPa, and a warp ratio of 1.0% or less. Since the filter substrate has a relatively small thickness, it is light weight. The suitable surface compressive stress of the substrate gives high fracture strength thereto. The small warp ratio gives small optical distortion and excellent display quality to the substrate.

The display device of the present invention has a display body having a face for display and the filter substrate of the present invention disposed over the face.

DETAILED DESCRIPTION OF THE PREFERRED EMBODIMENTS

The filter substrate of the present invention may consist of soda lime glass.

The glass substrate has a thickness between 1.8 mm and 3.2 mm, so that it is relatively thin and is lightweight. Thickness smaller than 1.8 mm gives insufficient strength to the substrate, while thickness larger than 3.2 mm makes the substrate excessively heavy in weight.

The glass substrate can be reinforced by an air blast cooling process or by a chemical reinforcing process so that the substrate has the average surface compressive stress between 20MPa and 70MPa. When the average surface compressive stress is less than 20 MPa, the glass substrate has insufficient strength. The higher surface compressive stress is preferable in view of strength. However, to apply the stress higher than 70 MPa to the substrate, the substrate is required to be heated at an excessively high temperature either in the air blast cooling process or in the chemical reinforcing process, whereby the substrate is deformed under the high temperature to have a large warp and waviness. Accordingly, the surface compressive stress of the substrate is preferably in a range between 20 MPa and 70 MPa, more preferably between 40 MPa and 60 MPa. The filter substrate having the surface compressive stress in the above range has light weight, excellent safety in practice, and excellent display quality.

The substrate can be reinforced by an air blast cooling process at low cost. It can be reinforced also by a chemical process including a step of immersing the substrate in melted salt for ion-exchange, which brings an excellent display quality due to a lower heating temperature in the process than that in the air blast cooling process.

The substrate is heated in the air blast cooling process preferably at a temperature between 520° C. and 560° C., more preferably between 530° C. and 550° C. The air is blasted during cooling process preferably at a wind pressure of 15 kPa to 30 kPa, more preferably 20 kPa to 25 kPa.

When the substrate is reinforced by the chemical process, the temperature of the melted salt is preferably from 400° C. to 450° C., more preferably from 410° C. to 430° C. The substrate is immersed in the melted salt preferably for 2 to 6 hours, more preferably about 4 hours.

Sodium ions in the surface area of the glass substrate are exchanged with potassium ions in the melted salt, wherein the potassium salt may be potassium nitrate.

Warping and waviness may be caused on the glass substrate due to the above reinforcing process. The warp ratio of not more than 1.0% improve reflected images on the glass substrate.

Figure 1:
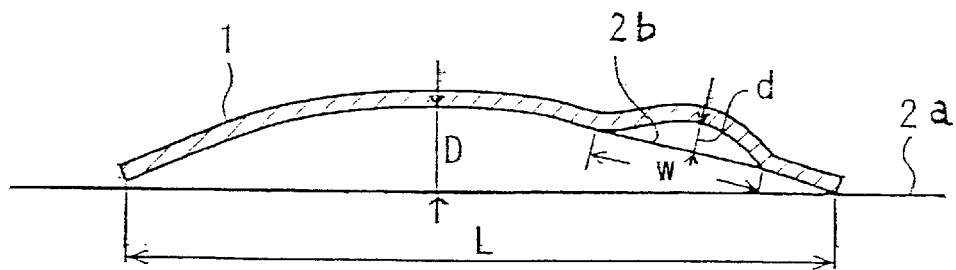
FIG. 1 is a view for explaining a method of measuring warping and waviness of a glass substrate.

The warp ratio is defined according to JIS R3222. That is, a glass substrate 1 is set as shown in FIG. 1 and a reference line 2a is provided. The depth D of the warped substrate is measured. The warp ratio is defined as D/L·100%, wherein L is a length of the substrate. The warp ratio is preferably 0.8% or less, more preferably 0.6% or less.

The filter substrate has preferably the waviness ratio of 1.0% or less, more preferably 0.6% or less. This waviness ratio is defined as shown in FIG. 1. The width (pitch) w and the depth d of a waviness (local distortion) are measured, and the waviness ratio is defined as d/w·100%.

Usually, a filter substrate for a display device has more defects causing breakage thereof at a peripheral portion than a central portion of the substrate. When the substrate has the surface compressive stress at the peripheral portion as high as 80% or more of the average surface compressive stress of the central portion thereof, the substrate has enough strength at its peripheral portion.

The peripheral portion of the substrate may be provided with a masking layer to hide components, such as wires, disposed behind it. The masking layer may have a thickness of 35 μm or less.

The masking layer may be formed, for example, by applying a paste including a low-melting glass and a pigment onto the glass substrate, drying it if necessary, and then baking it.

The low-melting glass may be lead borosilicate glass, lead silicate glass, or glass-ceramics such as of lead (Pb)-silicon (Si)-boron (B) series, of zinc (Zn) series, and of bismuth (Bi) series, wherein the glass preferably has a softening point of 500° C. or less. The lead borosilicate glass may include 50–70 mass % of lead oxide (PbO), 30–40 mass % of silica ($SiO_2$), and 0–20 mass %, in total, of boron oxide ($B_2O_3$) and alkali or alkaline earth metal oxide ($R_xO_y$). The lead silicate glass may include 50–70 mass % of lead oxide (PbO), 30–40 mass % of silica ($SiO_2$), and 0–20 mass % of alkali or alkaline earth metal oxide ($R_xO_y$). The pigment may be an inorganic pigment selected from the group consisting of copper oxide (CuO), chromium oxide ($Cr_2O_3$), iron oxide ($Fe_2O_3$), cobalt oxide (CoO), manganese dioxide ($MnO_2$), aluminium oxide ($Al_2O_3$), zinc oxide (ZnO), lead chromate ($PbCr_2O_4$), lead sulfate ($PbSO_4$), lead molybdate ($PbMoO_4$), and a mixture thereof.

The paste can include a medium for making the mixture of the low-melting glass and the pigment into paste, wherein the medium may be a solvent such as pine oil; or a resin such as cellulose resins, acrylic resins, rosin resins, and ester resins.

When the masking layer contains the low-melting glass and the pigment, the maximum width of the masking layer is preferably 50 mm or less from the outer edge of the substrate. The width more than 50 mm easily occurs deformation on outer periphery of the substrate due to heating during the air blast cooling process, thereby reducing display quality. This may be because that the glass temperature of a portion covered by the masking layer is higher than that of the other portions in the heating process so that much deformation is produced in the masking portion during the rapid cooling process.

The masking layer may be formed on the substrate by another process comprising steps of applying paste including a thermosetting synthetic resin and a pigment and/or dye onto the glass substrate, drying it if necessary, and then baking it.

The thermosetting synthetic resin can be cured after applied to the substrate having a surface compressive stress, since the thermosetting synthetic resin sets usually at a temperature about 150° C., whereby the substrate is hardly deformed thermally during the thermosetting process, and the glass substrate keeps excellent in its display quality.

The thermosetting synthetic resin may be epoxy resin, acrylic silicone resin, alkyd resin, polyamide resin, or fluororesin.

The pigment can be an inorganic pigment referred above in connection with the low-melting glass. The dye can be an organic dye such as of phthalocyanine-series, dioxazine-series, and anthraquinone-series. A medium for making the mixture of the thermosetting synthetic resin and the pigment and/or dye into paste may be a solvent such as diethylene glycol monobutyl ether acetate and ethylene glycol monobutyl ether. A modified aliphatic polyamine resin or N-butanol may be mixed as a thermosetting reaction accelerator. Whether the masking layer is formed with the low-melting glass or the thermosetting resin, the additive amount of pigment and/or dye for the masking layer should be determined to provide sufficient shielding efficiency, concretely, should be determined so that the optical absorbance of the masking layer is 3.0 or more. The absorbance of the masking layer less than 3.0 provides insufficient shielding for the masking layer. It is particularly preferable that the absorbance is 4.0 or more. The absorbance is defined as a common logarithm of an inverse number of an optical transmittance (T).

The masking layer is preferably black in view of shielding efficiency. However, it may be red, blue, or other mixed color for designing the display decoratively.

The paste for the masking layer can be applied to the filter substrate by any methods including a screen printing method for mass production.

The masking layer has preferably a thickness of 35 μm or less, more preferably 30 μm or less. The thickness of the masking layer more than 35 μm produces a large step portion at the boundary between the masking layer surface and the glass substrate surface, so that air is easily entrapped about the step portion when an electromagnetic-shielding film, a near infrared ray blocking film, or an anti-reflection film is laminated to the filter substrate.

The display device of the present invention employs the filter substrate of the present invention. The display device may be a plasma display device, a field emission display device, or a cathode ray tube.

EXAMPLES 1, 2, 3 AND 4

Glass substrates of 1.8 mm (in Example 1), 2.5 mm (in Example 2), 3.2 mm (in Example 3) and 2.5 mm (in Example 4), respectively, in thickness were cut to be 1000 mm×600 mm in size and were chamfered. A masking material consisting of 56 mass % of lead borosilicate glass powder, 26 mass % of black pigment composed of a complex oxide of copper oxide (CuO) and chromium oxide ($Cr_2O_3$), and 18 mass % of solvent mainly composed of pine oil was applied to an outer peripheral portion of 30 mm in width of the glass substrates by using a screen of 200 meshes made of stainless-steel wires and, after that, was dried at room temperature. The substrates were heated at 555° C. (in Example 1), 545° C. (in Example 2), 540° C. (in Example 3), 530° C. (in Example 4) respectively in a heating furnace, through which each substrate passed at a speed of 140 mm/sec and, after that, were rapidly cooled by air blasting at wind pressure of 20 kPa for three seconds.

The surface compressive stress and the warp were measured based on JIS3222. Variations were calculated as follows:

When the difference of (maximum value−average value) is greater than the difference of (average value−minimum value), the variation was calculated by the equation of [(maximum value−average value)/average value].

When the difference of (maximum value−average value) is smaller than the difference of (average value−minimum value), the variation was calculated by the equation of [(average value−minimum value)/average value].

Falling ball strength tests were conducted based on ANSI/UL1418. Height at which each sample was broken was recorded. Reflected images were made by transferring lattice pattern to the glass substrates as shown in FIG. 2 and were evaluated according to the degree of deformation.

Figure 2A:
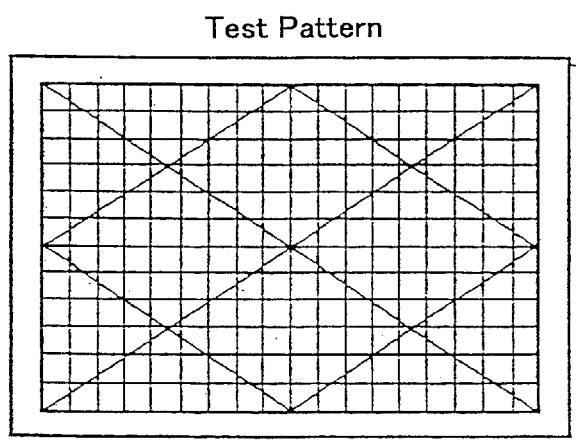
FIGS. 2a and 2b are views for explaining a method of measuring a reflected image.
Figure 2B:
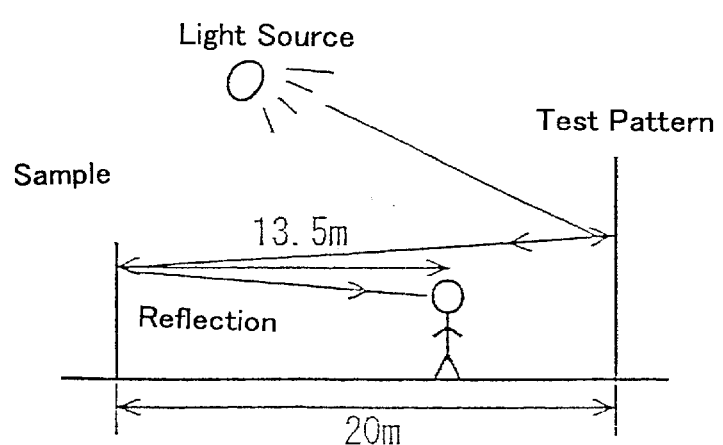

A check pattern having a pitch of 15 cm and a line width of 2 cm as shown in FIG. 2a was used. In the arrangement as shown in FIG. 2b, a photograph of the pattern projected on the glass was taken. The grade of each glass sample was evaluated by comparison with a referential photograph. In detail, for taking the photographs, a 35 mm camera with 135 mm telephoto lens was positioned at the same location. The photographs taken by the camera were enlarged by 11.3 times. Comparison between the enlarged photograph and a referential photograph taken by using a standard glass substrate was made. When the reflected image was better, "◯" indicating "good" was given for evaluation. When the reflected image was worse, "×" indicating "inferior" was given for evaluation.

These results are shown in Table 1.

Comparative Examples 1, 2

The application of masking material and the heat air blast cooling treatment were conducted in the same manner as Examples 1 through 4, except that the glass substrates had a thickness of 1.1 mm (in Comparative Example 1) and 3.5 mm (in Comparative Example 2), and were heated at 563° C. (in Comparative Example 1), and 535° C. (in Comparative Example 2), respectively.

Comparative Examples 3, 4

The application of masking material and the air blast cooling treatment were conducted in the same manner as Examples 1 through 4, except that the glass substrates had a thickness of 2.5 mm and were heated at 520° C. (in Comparative Example 3), and 560° C. (in Comparative Example 4), respectively.

Comparative Example 5

The application of masking material and the air blast cooling treatment were conducted in the same manner as Examples 1 through 4, except that the glass substrate had a thickness of 2.5 mm and was heated at 545° C. in the furnace where the substrate passed at a speed of 280 mm/sec.

Each result of measurements of surface compressive stress, warp, falling ball breakage height, reflected image, and weight are shown in Table 1. As shown in Table 1, each of Examples 1 through 4 has results that the falling ball breakage height is high, the reflection image is better, and the weight is light.

To the contrary, Comparative Example 1 has results that because the glass substrate is thin to be 1.1 mm in thickness, the falling ball breakage height is 100 cm which is lower than the standard height 130 cm, and the warp ratio is too large to obtain good reflected image.

Comparative Example 2 has results that because the glass substrate is thick to be 3.5 mm in thickness, the strength, the warp ratio, and the reflected image are good but the weight is heavier than 5 kg.

Comparative Example 3 has results that because the heating temperature before the air blast cooling treatment is as low as 520° C., the surface compressive stress is as low as 15 MPa. Accordingly, the filter substrate has insufficient strength.

Comparative Example 4 has results that because the heating temperature for the air blast cooling treatment is as high as 560° C., the reflected image is inferior, even though the surface compressive stress is satisfactorily as high as 80 MPa.

Comparative Example 5 has results because the residence time of the substrate to be heated in the furnace before air blasting is too short, the reduction ratio of the surface compressive stress of the masking portion to the transparent portion is as low as 75%, and the falling ball breakage height is unsatisfactorily 125 cm.

It should be noted that the thickness of the masking layer of each filter substrate of Examples 1–4 was calculated as a difference in thickness between a portion applied with masking material and a portion without masking material both measured by using a micro meter, and the thickness of masking layer of each filter substrate was 25 μm. When a resin film was laminated on each filter substrate, no air was entrapped about the step portion between the masking layer and the glass substrate surface.

TABLE 1

| Test No. | Thickness of substrate (mm) | Heating temperature (° C.) | Surface compressive stress (MPa) | Ratio of surface compressive stress between masking portion and transparent portion | Warp ratio | Falling ball breakage height (cm) | Reflected image | Weight (kg) |
| --- | --- | --- | --- | --- | --- | --- | --- | --- |
| Example 1 | 1.8 | 555 | 53 | 91% | 0.5% | 150 | ◯ | 2.7 |
| Example 2 | 2.5 | 545 | 55 | 92% | 0.4% | 200 | ◯ | 3.75 |
| Example 3 | 3.2 | 540 | 54 | 92% | 0.2% | 300 | ◯ | 4.8 |
| Example 4 | 2.5 | 530 | 25 | 93% | 0.2% | 150 | ◯ | 3.75 |
| Comparative Example 1 | 1.1 | 563 | 55 | 92% | 1.5% | 100 | x | 1.65 |
| Comparative Example 2 | 3.5 | 535 | 53 | 93% | 0.2% | 375 | ◯ | 5.25 |
| Comparative Example 3 | 2.5 | 520 | 15 | 93% | 0.4% | 100 | ◯ | 3.75 |

TABLE 1-continued

| Test No. | Thickness of substrate (mm) | Heating temperature (° C.) | Surface compressive stress (MPa) | Ratio of surface compressive stress between masking portion and transparent portion | Warp ratio | Falling ball breakage height (cm) | Reflected image | Weight (kg) |
|---|---|---|---|---|---|---|---|---|
| Comparative Example 4 | 2.5 | 560 | 80 | 93% | 0.4% | 250 | x | 3.75 |
| Comparative Example 5 | 2.5 | 545 | 50 | 75% | 0.4% | 125 | ○ | 3.75 |

EXAMPLE 5

A masking layer was formed with a masking material mainly composed of a pigment and thermosetting resin instead of the low-melting glass used in Example 2. The masking material consists of a thermosetting resin composed of 30 mass % of epoxy resin mixed with 4 mass % of ethylene glycol monobutyl ether as a solvent, a mixture as a pigment of 22 mass % of lead chromate, 7 mass % of lead sulfate, and 2 mass % of lead molybdate, a mixture as a thermosetting reaction accelerator of 22 mass % of modified aliphatic polyamine resin and 3 mass % of N-butanol, and 10 mass % of diethyl glycol monobutyl ether acetate as a solvent for controlling viscosity.

A glass substrate of 2.5 mm in thickness which was the same as that used in Example 2 was heated at 545° C. in a furnace where the substrate passed at a speed of 140 mm/sec and rapidly cooled by air blast at wind pressure of 20 kPa for three seconds. After that, the aforementioned masking material was screen-printed to an outer peripheral portion of 30 mm in width of the glass substrate with using a screen of 200 meshes made of stainless-steel wires and, after that, was dried at a temperature of 150° C. for 30 minutes to form the masking layer.

EXAMPLE 6

A filter substrate was manufactured similarly to Example 5. The application of masking material and the air blast cooling treatment were conducted in the same manner as Example 5, except that the width of screen-printed area was 60 mm.

EXAMPLE 7

A filter substrate was manufactured similarly to Example 6. The application of masking material was conducted in the same manner as Example 6, except that the substrate was reinforced by chemical treatment in which the substrate was immersed in a melted salt of potassium nitrate ($KNO_3$) for 4 hours, instead of being heated and, then, cooled rapidly.

Comparative Example 6

A filter substrate was manufactured similarly to Example 2. The application of masking material and the air blast cooling treatment were conducted in the same manner as Example 2, except that a 150-mesh screen was employed.

Since the screen was coarse, the applied amount of the masking material was increased. As a result, the thickness of the masking layer was as large as 42 μm. When a film was laminated to the filter substrate of this example, air was entrapped by the film about the step portion between the masking layer and the glass substrate surface.

Comparative Example 7

A filter substrate was manufactured similarly to Example 2. The application of masking material and the air blast cooling treatment were conducted in the same manner as Example 2, except that a 325-mesh screen was employed.

Since the screen was fine, the applied amount of the masking material was reduced. As a result, the thickness of the masking layer was as small as 13 μm. Accordingly, the optical absorbance of visible light of the masking layer was as low as 2.5.

Comparative Example 8

A filter substrate was made similarly to Example 2. The application of masking material and the air blast cooling treatment were conducted in the same manner as Example 2, except that the width of the printed area of the masking layer was 60 mm.

The width of the masking layer was much wider than 50 mm, whereby the glass substrate was observed to have defective reflected images due to the low-melting glass contained in the masking material.

Results of characteristic measurements of filter substrates of Examples 2, 5–7 and Comparative Examples 6–8 are shown in Table 2.

As shown in Table 2, each of Examples 2, 5 through 7 has a high visible-light absorbance since the masking layer is sufficiently effective. In addition, the reflected images are good and no air is entrapped when a film is laminated on the substrate.

To the contrary, as described above, in Comparative Example 6, air is entrapped when a film is laminated on the substrate due to the large thickness of the masking layer. In Comparative Example 7, the masking layer is poor in the masking effect due to the small thickness thereof. In Comparative Example 8, the reflected image is inferior due to the large width of the masking layer.

In Examples 6, 7, though the width of the masking layer is as large as 60 mm, the reflected images are good because the masking layer contains the thermosetting synthetic resin. In Example 7 particularly, since the surface compressive stress is applied by the chemical reinforcement treatment, the warpage and waviness of the glass substrate is reduced, leading to an excellent reflected image.

TABLE 2

| Test No. | Thickness of substrate (mm) | Method of applying surface compressive stress | Surface compressive stress (MPa) | Masking material | Thickness of masking layer (μm) | Visible-light absorbance of masking layer | Width of masking Layer (μm) | Reflected images | Occurrence of entrapped air | Masking effect |
|---|---|---|---|---|---|---|---|---|---|---|
| Example 2 | 2.5 | air blast cooling | 55 | low-melting glass + pigment | 25 | 4.0 | 30 | ○ | none | sufficient |
| Example 5 | 2.5 | air blast cooling | 55 | thermosetting resin + pigment | 27 | 4.1 | 30 | ○ | none | sufficient |
| Example 6 | 2.5 | air blast cooling | 58 | thermosetting resin + pigment | 26 | 4.0 | 60 | ○ | none | sufficient |
| Example 7 | 2.5 | chemical reinforcing process | 53 | thermosetting resin + pigment | 28 | 4.0 | 60 | ◎ | none | sufficient |
| Comparative Example 6 | 2.5 | air blast cooling | 53 | low-melting glass + pigment | 42 | 5.1 | 30 | ○ | exist | sufficient |
| Comparative Example 7 | 2.5 | air blast cooling | 56 | low-melting glass + pigment | 13 | 2.5 | 30 | ○ | none | insufficient |
| Comparative Example 8 | 2.5 | air blast cooling | 54 | low-melting glass + pigment | 24 | 4.0 | 60 | x | none | sufficient |

INDUSTRIAL APPLICABILITY

According to the present invention, a front filter glass substrate for a display can be provided which has considerable strength, does not allow deterioration of display quality, and has light weight. Further, a display device employing this filter substrate can be provided.

What is claimed is:

1. A filter substrate for a display device comprising a glass substrate and having at least one function of electromagnetic-wave shielding function, near infrared ray blocking function, and anti-reflection function,
   wherein the glass substrate has a thickness between 1.8 mm and 3.2 mm, an average surface compressive stress between 20 MPa and 70 MPa, and a warp ratio of 1.0% or less.

2. A filter substrate as claimed in claim 1, wherein the substrate has the average surface compressive stress between 40 MPa and 60 MPa.

3. A filter substrate as claimed in claim 1, wherein the surface compressive stress is produced by heating the glass substrate and then cooling it rapidly.

4. A filter substrate as claimed in claim 1, wherein the surface compressive stress is produced by immersing the glass substrate in melted salt so as to exchange sodium ions in the glass substrate and potassium ions in the melted salt.

5. A filter substrate as claimed in claim 1, wherein said filter substrate is provided with a masking layer for shielding visible light formed partially or entirely around the periphery thereof.

6. A filter substrate as claimed in claim 5, wherein said masking layer has a thickness of 35 μm or less.

7. A filter substrate as claimed in claim 5, wherein said masking layer is formed by baking low-melting glass containing pigment on the peripheral portion, and has a width of 50 mm or less from the peripheral edge of the filter substrate.

8. A filter substrate as claimed in claim 5, wherein said masking layer contains at least a thermosetting resin and a pigment or dye.

9. A filter substrate as claimed in claim 5, wherein said masking layer has an optical absorbance of 3.0 or more in the visible wavelength range.

10. A filter substrate as claimed in claim 5, wherein the surface compressive stress at the portion coated with said masking layer is 80% or more of the average of the surface compressive stress of the glass substrate at a portion without masking.

11. A display device having the filter substrate of claim 1.

* * * * *